United States Patent
Brama

(10) Patent No.: US 11,732,820 B2
(45) Date of Patent: Aug. 22, 2023

(54) ACTIVATING TRIP FUNCTIONS OF A SAFETY VALVE POSITIONER BY WAY OF A CONTROL PANEL TO ACHIEVE A SAFE STATE

(71) Applicant: FISHER CONTROLS INTERNATIONAL LLC, Marshalltown, IA (US)

(72) Inventor: Marwan Brama, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 137 days.

(21) Appl. No.: 17/078,935

(22) Filed: Oct. 23, 2020

(65) Prior Publication Data

US 2022/0128171 A1  Apr. 28, 2022

(51) Int. Cl.
*F16K 37/00* (2006.01)
*G06F 3/0484* (2022.01)
*G05B 15/02* (2006.01)

(52) U.S. Cl.
CPC ...... *F16K 37/0083* (2013.01); *F16K 37/0041* (2013.01); *G05B 15/02* (2013.01); *G06F 3/0484* (2013.01)

(58) Field of Classification Search
CPC combination set(s) only.
See application file for complete search history.

(56) References Cited

U.S. PATENT DOCUMENTS

| 7,289,861 | B2 | 10/2007 | Aneweer et al. |
| 7,865,251 | B2 | 1/2011 | Law et al. |
| 2001/0013664 | A1* | 8/2001 | Kobayashi ............... F02M 1/02 261/61 |
| 2001/0030988 | A1* | 10/2001 | Fry ...................... H04B 1/7136 375/E1.034 |
| 2001/0032518 | A1* | 10/2001 | Boger ...................... G05B 5/01 73/861 |
| 2001/0042371 | A1* | 11/2001 | Topfer-Hartung ........................ F02D 41/0027 73/23.32 |
| 2001/0043450 | A1* | 11/2001 | Seale ..................... H02N 15/00 361/160 |
| 2002/0108436 | A1* | 8/2002 | Albuaijan ........... F16K 37/0083 73/865.9 |

(Continued)

OTHER PUBLICATIONS

Emerson, "Advantages of Using Linkageless, Non-Contact Feedback Technology in Digital Positioners". Retrieved from the Internet at: <https://www.emerson.com/documents/automation/white-paper-advantages-of-using-linkage-less-non-contact-feedback-technology-in-digital-positioners-fisher-en-135386.pdf> dated Sep. 18, 2020.

(Continued)

*Primary Examiner* — Tuan C Dao
(74) *Attorney, Agent, or Firm* — Marshall, Gerstein & Borun LLP

(57) ABSTRACT

The described methods and systems enable a control panel for a safety valve in a safety system of a process control environment to couple to a safety loop that couples a logic solver to a valve positioner for the safety valve. The control panel may drive a loop current on the safety loop to a desired range, thereby causing the valve positioner to respond by initiating a desired function triggered by the loop current entering the desired range. The desired function may be a trip function, a reset function, or a stroke test function.

22 Claims, 8 Drawing Sheets

(56) References Cited

U.S. PATENT DOCUMENTS

| | | | | |
|---|---|---|---|---|
| 2003/0043052 | A1* | 3/2003 | Tapperson | G05B 19/4185 709/234 |
| 2003/0101738 | A1* | 6/2003 | Yim | F25B 47/025 62/234 |
| 2004/0124854 | A1* | 7/2004 | Slezak | G01F 23/284 324/644 |
| 2005/0260471 | A1* | 11/2005 | Logan | H01M 8/04582 429/429 |
| 2005/0274417 | A1* | 12/2005 | Perry | G05B 23/0256 137/487.5 |
| 2007/0158126 | A1* | 7/2007 | Baldet | F16H 48/08 180/249 |
| 2007/0247000 | A1* | 10/2007 | Fugiel | G01M 17/08 303/122.08 |
| 2015/0051671 | A1* | 2/2015 | Browne | A61N 5/0616 607/90 |
| 2015/0097534 | A1* | 4/2015 | Bhattad | G05F 1/462 323/270 |
| 2016/0164341 | A1* | 6/2016 | Budde | H02M 7/04 307/66 |
| 2017/0075510 | A1* | 3/2017 | Bentz | G06F 3/04845 |
| 2018/0138735 | A1* | 5/2018 | Maalouf | H02J 50/12 |
| 2018/0209833 | A1* | 7/2018 | Haynes | B08B 3/08 |
| 2019/0338724 | A1* | 11/2019 | Price | F01L 9/20 |
| 2019/0372529 | A1* | 12/2019 | Moretti | H03F 3/45475 |
| 2020/0028386 | A1* | 1/2020 | Sexton | H02J 50/10 |
| 2022/0010816 | A1* | 1/2022 | Kusiak | F04B 49/225 |
| 2022/0055445 | A1* | 2/2022 | Andrade Dias | B60H 1/00014 |

OTHER PUBLICATIONS

Emerson, "Fisher™ FIELDVUE™ DVC6200 SIS Digital Valve Controller". Retrieved from the Internet at: <https://www.emerson.com/documents/automation/instruction-manual-fisher-fieldvue-dvc6200-sis-digital-valve-controller-en-122736.pdf> dated Sep. 18, 2020.

Emerson, "Safety manual for Fisher™ Fieldvue DVC6200 SIS Digital Valve Controller, Position Monitor, and LCP200 Local Control Panel". Retrieved from the Internet at: <https://www.emerson.com/documents/automation/im-supplement-safety-manual-for-fieldvue-dvc6200-sis-digital-valve-controller-position-monitor-lcp200-local-control-panel-en-125602.pdf> dated Sep. 18, 2020.

Chemical Engineering Progress, "Leveraging Smart Valve Positioners". Retrieved from the Internet at: <https://www.emerson.com/documents/automation/article-leveraging-smart-valve-positioners-fisher-en-518420.pdf> dated Sep. 18, 2020.

Emerson, "Fisher™ Fieldvue DVC6200 SIS Digital Valve Controller for Safety Instrumented Systems (SIS)". Retrieved from the Internet at: <https://www.emerson.com/documents/automation/product-bulletin-fieldvue-dvc6200-sis-digital-valve-controller-for-safety-instrumented-systems-sis-en-123328.pdf? dated Sep. 18, 2020.

Emerson, "Fisher™ LCP200 Local Control Panel". Retrieved from the Internet at: <https://www.emerson.com/documents/automation/product-bulletin-fisher-lcp200-local-control-panel-en-4180936.pdf> dated Sep. 18, 2020.

* cited by examiner

ACTIVATING TRIP FUNCTIONS OF A SAFETY VALVE POSITIONER BY WAY OF A CONTROL PANEL TO ACHIEVE A SAFE STATE

TECHNICAL FIELD

The present disclosure generally relates to tripping a smart safety valve positioner, and, more specifically, to doing so by utilizing a control panel to manipulate a loop current that triggers the smart safety valve positioner's built-in tripping function.

BACKGROUND

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system (sometimes called a "safety instrumented system" or "SIS") is provided to detect significant safety related problems within the process plant and to automatically close valves, remove power from devices, switch flows within the plant, etc. when a problem occurs which might result in a serious hazard in the plant, such as a spill of toxic chemicals, an explosion, etc. What a safety system or SIS shall do (the functional requirements) and how well it must perform (the safety integrity requirements) may be determined from hazard and operability studies (HAZOP), layers of protection analysis (LOPA), risk graphs, and so on. Example techniques are mentioned in IEC 61511 and IEC 61508. During safety system or SIS design, construction, installation, and operation, safety personnel typically verify that these requirements are met. The functional requirements may be verified by design reviews, such as failure modes, effects, and criticality analysis (FMECA) and various types of testing (e.g., example factory acceptance testing, site acceptance testing, and regular functional testing).

Generally speaking, a safety system or SIS is engineered to perform "specific control functions" to failsafe or to maintain safe operation of a process when unacceptable or dangerous conditions occur. Typically, a safety system should be relatively independent from other control systems in order to ensure safety system functionality is not compromised. A safety system is typically composed of the same types of control elements (including sensors, logic solvers or controllers, actuators and other control equipment) as a Basic Process Control System (BPCS). However, in typical implementations, the control elements in a safety system are dedicated solely to the proper functioning of the safety system (e.g., rather than proper control of the process controlled by the control system).

Generally, a "Safety Instrumented Function" or "SIF" is a particular set of equipment in a safety system intended to reduce risk associated with a particular hazard, and may be thought of or referred to as a safety system control loop or "safety loop." A SIF is intended to (1) automatically take an industrial process to a safe state when specified conditions are violated; (2) permit a process to move forward in a safe manner when specified conditions allow (permissive functions); or (3) take action to mitigate the consequences of an industrial hazard. A SIF is typically implemented as part of an overall risk reduction strategy that is intended to eliminate the likelihood of a previously identified Safety, Health and Environmental (SH&E) event that could range from minor equipment damage to an event involving an uncontrolled catastrophic release of energy and/or materials.

Typically, each SIF or safety loop is assigned a certain level of protection, defined by the "safety integrity level" or "SIL" (1, 2, 3 or 4), using one of the methodologies defined in IEC 61508/61511 as the "Risk Graph," the "Risk Matrix," or the LOPA. Assignment of SIL is an exercise in risk analysis where the risk associated with a specific hazard, that is intended to be protected against by a SIF, is calculated without the beneficial risk reduction effect of the SIF. That unmitigated risk is then compared against a tolerable risk target. The difference between the unmitigated risk and the tolerable risk, if the unmitigated risk is higher than tolerable, must be addressed through risk reduction of the SIF. This amount of required risk reduction is correlated with the SIL target. In essence, each order of magnitude of risk reduction that is required correlates with an increase in one of the required SIL numbers. In a typical example, SIL-1 represents a risk reduction of up to 100×; SIL-2 represents a risk reduction of up to 1000×; SIL-3 represents a risk reduction of up to 10,000×; and SIL-4 represents a risk reduction of up to 100,000×.

The International Electrotechnical Commission's (IEC) standard IEC 61508 defines SIL using requirements grouped into two broad categories: hardware safety integrity and systematic safety integrity. A device or system generally should meet the requirements for both categories to achieve a given SIL. The SIL requirements for hardware safety integrity are based on a probabilistic analysis of the device. In order to achieve a given SIL, the device typically meet targets for the maximum probability of dangerous failure and a minimum safe failure fraction. Typically, the concept of "dangerous failure" is defined for the system in question, normally in the form of requirement constraints whose integrity is verified throughout system development. The actual targets required vary depending on the likelihood of a demand, the complexity of the device(s), and types of redundancy used.

As noted, safety systems typically have one or more separate logic solvers or controllers, apart from the process control controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant representing abnormal conditions. When an event is detected, the safety controller takes some action to limit the detrimental effect of the event, such as transmitting a command to close one or more valves, deactivate or turn off one or more devices, remove power from sections of the plant, etc.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

The described methods and systems enable a control panel for a safety valve in a safety system of a process control environment to manipulate a loop current used by a valve positioner (sometimes simply "positioner") for the safety valve, thereby causing the valve positioner to initiate a trip function in which the safety valve is placed in a safe state.

In an embodiment, a method for controlling safety valves comprises electrically coupling a control panel to a safety loop that communicatively couples a logic solver to a valve positioner for a safety valve. The logic solver may be configured to control the safety valve by varying a loop current on the safety loop to cause the valve positioner to adjust the safety valve to a desired position. The method may comprise detecting (at the control panel) an actuation of a user interface element of the control panel that represents a trip command. The control panel may respond to the actuation by manipulating the loop current on the safety loop such that the loop current enters a particular range. The method may comprise detecting (at the valve positioner) the loop current entering the particular range. Finally, the method may comprise the valve positioner responding to detecting the loop current entering the range by initiating a trip function configured to drive the safety valve to a safe state.

In an embodiment, a system (e.g., a process control system) comprises a valve positioner for controlling a safety valve. The valve positioner may be coupled, via a safety loop (e.g., a 4-20 mA loop), to a safety controller or logic solver that transmits a command signal to the valve positioner to thereby drive the position of the safety valve. The system may comprise a control panel that is coupled to the safety loop and that is configured to manipulate the current on the safety loop (e.g., to thereby control the behavior of the valve positioner). The control panel may include one or more buttons that enable a user to manually transmit one or more commands to the valve positioner via current manipulation (e.g., a trip command, a reset command, a test command, etc.).

The valve positioner may include any one or more of: (i) an output component configured to transmit an output signal to the safety valve to drive the position of the safety valve (e.g., to drive it closed or open); (ii) an input component configured to couple to the safety loop to thereby detect a loop current for a current signal (e.g., a 4-20 mA signal) on the safety loop; and/or (iii) a circuit configured to implement a control routine to control the output signal based on the loop current, wherein the circuit is configured to drive the output signal to a value selected to drive the position of the safety valve to a safe state in response to the loop current entering a preconfigured trip range.

The control panel may include any one or more of: (i) a communication interface configured to electrically couple to the safety loop; (ii) a user interface element representing a trip command; and/or (iii) a current control circuit electrically coupled to both the electrical output and the user interface element, wherein the current control circuit is configured to respond to an activation of the user interface element by drawing current from, or supplying current to, the safety loop sufficient to drive the loop current into the preconfigured trip range.

Note, this summary has been provided to introduce a selection of concepts further described below in the detailed description. As explained in the detailed description, certain embodiments may include features and advantages not described in this summary, and certain embodiments may omit one or more features or advantages described in this summary.

BRIEF DESCRIPTION OF THE DRAWINGS

The figures described below depict various aspects of the systems and methods disclosed herein. Understand that each figure depicts an embodiment of a particular aspect of the disclosed systems and methods, and that each figure is intended to accord with a possible embodiment thereof. Further, wherever possible, the following description refers to the reference numerals included in the figures.

DETAILED DESCRIPTION

As noted, the described methods and systems enable a local control panel ("LCP") for a safety valve in a safety system of a process control environment to couple to a safety loop that couples a logic solver to a valve positioner for the safety valve. The LCP may drive a loop current on the safety loop to a desired range, thereby causing the valve positioner to respond to the loop current entering the desired range by initiating a trip function of the valve positioner that is triggered by the loop current entering the desired range. Alternatively or additionally, in some embodiments, the LCP may be configured to manipulate the loop current to trigger a reset function or a stroke test function of the valve positioner.

Advantageously, the described techniques and systems enable an LCP to trip a valve positioner without messaging the valve positioner via typical means, such as digital communications (e.g., using the HART or Fieldbus protocols, or any other appropriate digital protocol). Generally speaking, for a given model of a typical control panel, typical trip messaging functions would need to be assessed for each model of safety valve controller/positioner with which the control panel may be paired so that the trip messaging for each pair of control panel model and positioner model could be assigned a safety rating (and thus be implemented in a manner compliant with safety standards). This safety assessment and rating process can be time intensive and costly. By contrast, the described techniques avoid this costly safety assessment and rating process by instead relying on a loop current manipulation to create a loop current trip condition for the valve positioner. A loop current trip function for the valve positioner can be assessed and assigned a safety rating, independent of the valve positioner's interactions with the LCP. By manipulating the loop current to cause the valve positioner to initiate its own loop current trip function, the LCP avoids the need to pursue additional safety assessments and ratings for a digital trip messaging operation.

As used herein, the term "trip" refers to a safety function triggered by an abnormal or undesired condition (e.g., a "trip condition"). The safety function may involve placing a device or system into a "failed" or "tripped" or "safe state." For example, tripping an LCP may cause the LCP to trip a valve positioner, which may in turn trip a safety valve (e.g., place the safety valve in a desired safe state). Generally speaking, a tripped device remains in a tripped state until it is reset, regardless of whether or not the trip condition remains (though this relationship could be configured such that removing the trip condition resets the device in question, if desired).

In any event, various techniques, systems, and methods are discussed below with reference to FIGS. 1-8.

I. Example Process Control Environment

Figure 1:
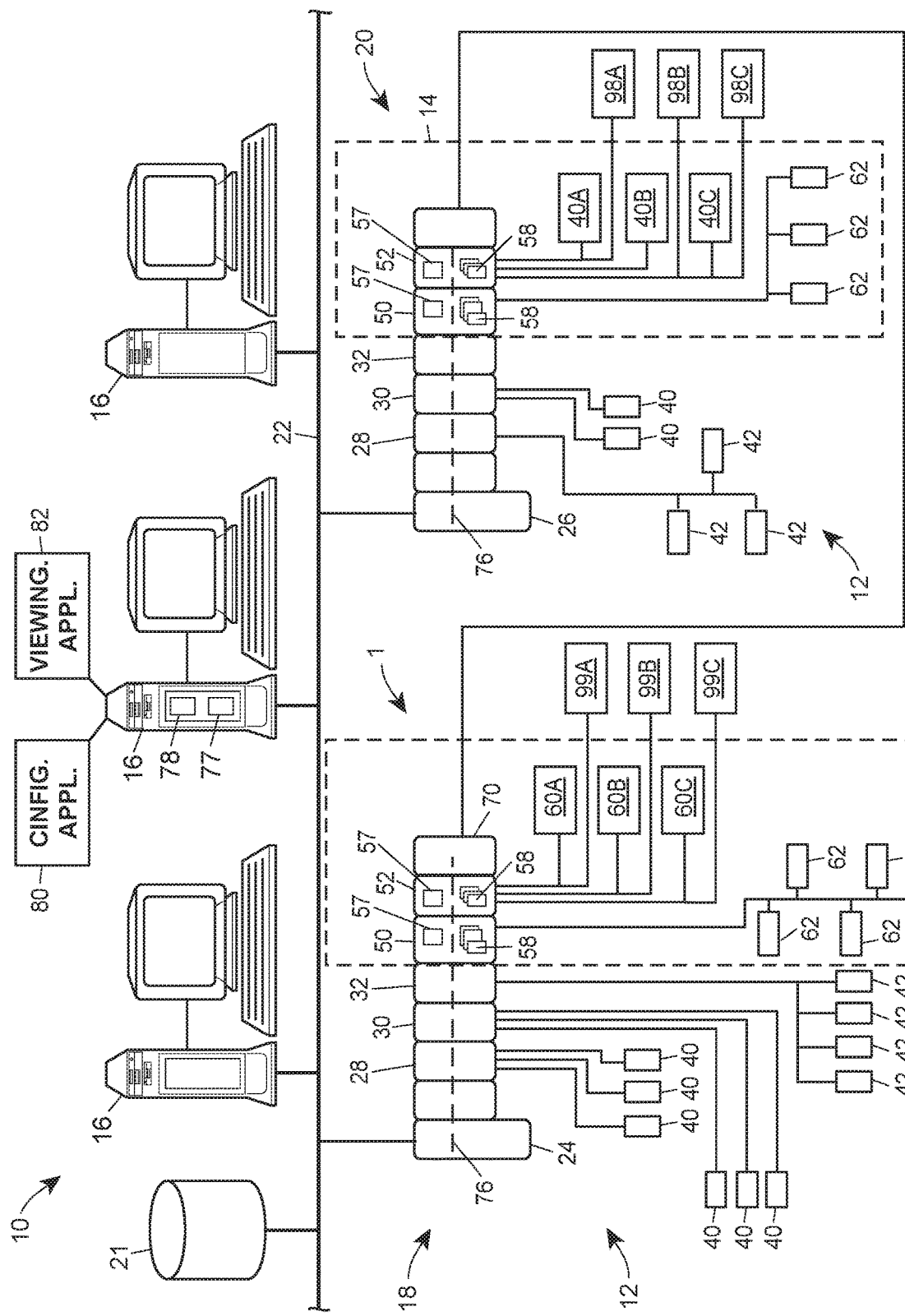
FIG. 1 depicts a process plant including a process control system integrated with a safety system.

FIG. 1 depicts a process plant 10 including a process control system 12 integrated with a safety system 14 (indicated by dotted lines), which generally operates as a Safety Instrumented System (SIS) to monitor and override the control provided by the process control system 12 to maximize the likely safe operation of the process plant 10. The safety system 14 includes a safety system control loop (sometimes "loop," "control loop," "safety loop," or "SIF") 1 including a safety system logic solver 50 coupled to a digital valve controller or smart valve positioner ("SVP") 60A for a safety valve, as well as a local control panel ("LCP") 99A for the safety loop 1.

The LCP 99A includes a user interface (e.g., including push buttons) to enable a user to manually trip the safety valve via the SVP 60A in a safe manner in accordance with the techniques and methods discussed herein. Specifically, the LCP 99A can manipulate a loop current to cause the SVP 60A to trip in a manner that does not require a safety assessment and does not require an assigned safety level beyond that already assigned to the internal trip function of the SVP 60A (e.g., SIL-3).

Before describing the safety loop 1 in more detail (see the discussion below regarding FIG. 4), the description below describes the structure and functionality of the larger process control system 12 and safety system 14.

A. Example Components of an Example Process Control System and an Example Safety System The process plant 10 includes one or more host workstations, computers or user interfaces 16 (which may be any type of personal computers, workstations, etc.) which are accessible by plant personnel, such as process control operators, maintenance personnel, configuration engineers, etc. In the example illustrated in FIG. 1, three user interfaces 16 are shown as being connected to two separate process control/safety control nodes 18 and 20 and to a configuration database 21 via a common communication line or bus 22. The communication network 22 may be implemented using any desired bus-based or non-bus-based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50-56 is an I/O device having a processor 57 that executes safety logic modules 58 stored in a memory and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74. The safety system logic solvers 50-56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Emerson Process Management, or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation Fieldbus protocol (as illustrated for the field devices 42), or the CAN, Profibus, the AS-Interface protocols, to name but a few. Similarly, the I/O devices 28-36 may be any known types of process control I/O devices using any appropriate communication protocol(s).

The safety logic solvers 50-56 of FIG. 1 may be any desired type of safety system control devices include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol.

A common backplane 76 (indicated by a dotted line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 52, 54 or 56 and 58 and to the MPDs 70 or 72. The controllers 24 and 26 are also communicatively coupled to, and operate as a bus arbitrator for the bus 22, to enable each of the I/O devices 28-36, the logic solvers 52-56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 14. However, if desired, these applications could be stored and executed in different ones of the workstations 14 or in other computers associated with the process plant 10. Generally speaking, the configuration application 80 provides configuration information to a configuration engineer and enables the configuration engineer to configure some or all elements of the process plant 10 and to store that configuration in the configuration database 21. As part of the configuration activities performed by the configuration application 80, the configuration engineer may create control routines or control modules for the process controllers 24 and 26, may create safety logic modules for any and all of the safety logic solvers 50-56 and may download these different control and safety modules to the appropriate ones of the process controllers 24 and 26 and the safety logic solvers 50-56 via the bus 22 and controllers 24 and 26. Similarly, the configuration application 80 may be used to create and download other programs and logic to the I/O devices 28-36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. Such an alarm display may receive and display alarms from both the process control system 12 and the safety system 14 in an integrated alarm display as the alarms from both systems 12 and 14 will be sent to the operator workstation 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems use the same types and kinds of parameters, security and referencing so that any data from one of the systems 12 and 14 can be integrated into a display or view traditionally provided for a process control system.

In any event, the applications 80 and 82 may send separate configuration and other signals to and may receive data from each process controllers 24 and 26 as well as from each of the safety system logic solvers 50-56. These signals may include process-level messages related to controlling the operational parameters of the process field devices 40 and 42, and may include safety-level messages related to controlling the operational parameters of the safety-related field devices 60 and 62. While the safety logic solvers 50-56 may be programmed to recognize both the process-level messages and the safety-level messages, the safety logic solvers 50-56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50-56 may employ the same or a different hardware or software design as compared to the hardware and software design used for the process control I/O cards 28-36. However, the use of alternate technologies for the devices within the process control system 12 and devices within the safety system 14 may minimize or eliminate common cause hardware or software failures.

Furthermore, the safety system devices, including the logic solvers 50-56 may employ any desired isolation and security techniques to reduce or eliminate the chances of unauthorized changes being made to the safety-related functions implemented thereby. For example, the safety logic solvers 50-56 and the configuration application 80 may require a person with a particular authority level or a person located at a particular workstation to make changes to the safety modules within the logic solvers 50-56, with this authority level or location being different from the authority or access level or location needed to make changes to the process control functions performed by the controllers 24 and 26 and the I/O devices 28-36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50-56 assess the incoming messages for proper form and security and operate as gatekeepers on changes being made to the safety-level control modules 58 executed within the safety logic solvers 50-56.

Furthermore, if desired, once safety-related functions are enabled within the logic solvers 50-56, no change of status to the safety functions can be made via the operator workstations 14 without proper access rights, which enables the communication structure associated with the process control system 12 to be used to provide initialization for the safety system 14 and to be used to provide run-time reporting of the operation of the safety system 14, but to still isolate the process control system 12 from the safety system 14 in the sense that changes to the process control system 12 cannot impact the operation of the safety system 14.

As will be understood, the use of the backplane 76 in each of the nodes 18 and 20 enables the safety logic solvers 50 and 52 and the safety logic solvers 54 and 56 to communicate locally with one other to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a configuration engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

B. Example Configuration Display Showing Safety System Devices

Figure 2:
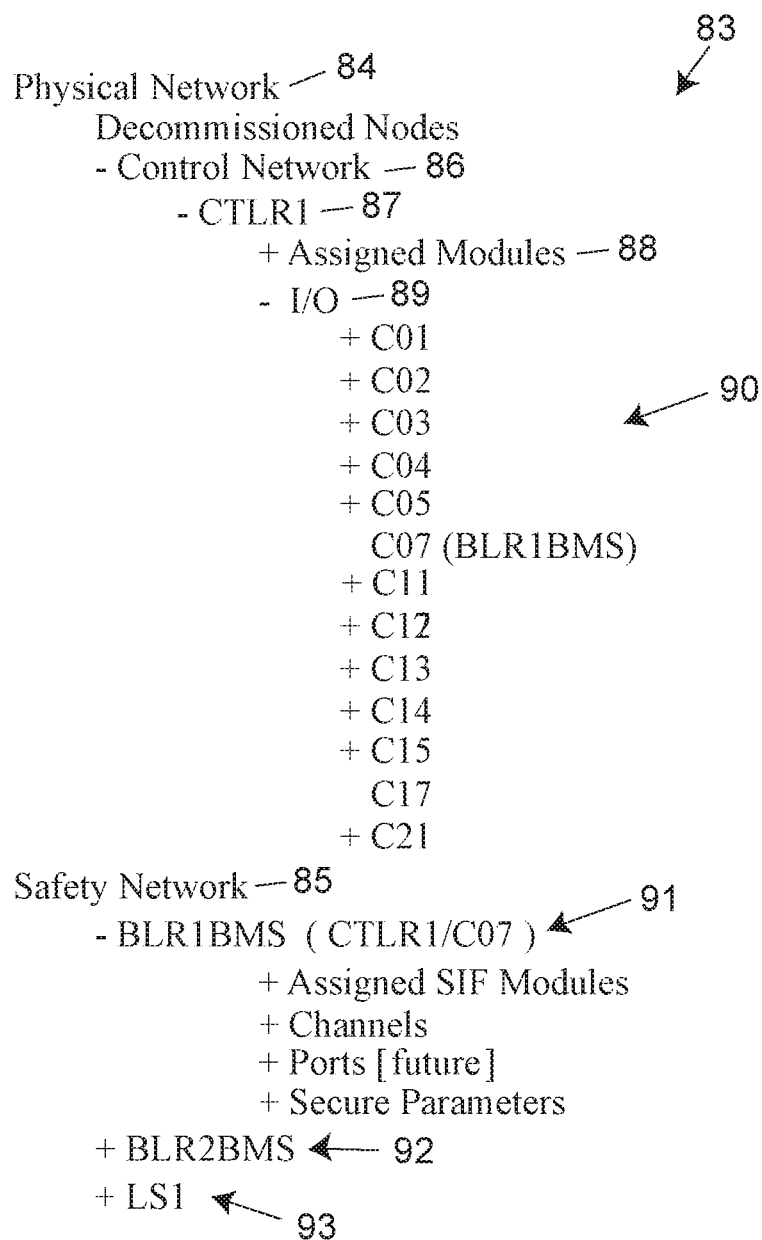
FIG. 2 illustrates a screen display that may be generated by the configuration routine shown in FIG. 1 depicting a configuration presentation having the safety system shown in FIG. 1 (including the logic solvers and the safety field devices) integrated with the process control system shown in FIG. 1.

FIG. 2 illustrates a screen display 83 that may be generated by the configuration routine 80 of FIG. 1 depicting a configuration presentation having the safety system 14 (including the logic solvers and the safety field devices) integrated with the process control system 12. It will be understood that the configuration display screen 83 of FIG. 2 illustrates the manner in which the configuration application 80 has configured the software associated with the different devices within the process plant 10 and can be used by a configuration engineer to create or alter the current configuration of the process plant 10 by downloading new configuration software to the devices within the process plant 10, including the process control system devices and the safety system devices.

As illustrated in the screen display 83, the process plant 10 includes a physical network section 84 which is used for displaying the physical interconnections of the devices within the process plant 10 and a safety network section 85 which is used for configuring safety system devices. The physical network section 84 includes a control network section 86 having a controller 87 (named CTRLR1). The controller 87, which may be one of the controllers of FIG. 1, includes a set of assigned modules 88 which are control modules stored in and executed by the controller 87 and an I/O devices section 89 connected to the controller 87 for communication purposes. The I/O devices section 89 is expanded to illustrate all of the cards 90 connected to the controller 87 (CTLR1) via one of the backplanes 76 of FIG. 1. In this example, I/O devices section 89 includes process control input/output cards C01-C05, C11-C15 and C21. Each of these cards may be expanded to illustrate the identity of and other information associated with the different field devices (which are individual ones of the field devices 40 and 42 of FIG. 1) connected to each of these cards. Similarly, for illustration of the physical connections, two safety system cards C07 (named BLR1BMS) and C017 (not yet configured). These cards are illustrated in a shaded format and cannot be expanded in this section because they cannot be configured in or by the control network. However, the devices associated with the process control system 12 can be configured using the control network section 86 of the screen 83 by adding, deleting, or changing control modules, I/O devices and/or field devices, to the configuration presentation.

The safety system 14 is illustrated in the safety network section 85 of the screen 83 as including three safety logic solvers 91-93 named BLR1BMS, BLR2BMS and LS1. Likewise, if desired, message propagation devices (such as the MPDs 70 and 72 of FIG. 1) may be illustrated in the safety network section 85. In the screen 83, the safety logic solver 91 is expanded to illustrate that it includes assigned safety modules, one or more channels (which are connected to safety field devices such as the devices 60 and 62 of FIG. 1) and secure parameters. Each of these elements could be further viewed, added to, deleted or changed in this section of the screen 83 to thereby configure the safety system 14. In particular, the safety system 14 can be configured and modified using the safety network section 85 in a manner similar to the manner of configuring the process control network 14 using the control network section 86. In fact, as will be understood, control or safety modules can be created and assigned to each of these different control and safety systems using the method for configuring a process control system as described in U.S. Pat. No. 5,838,563 which is assigned to the assignee of this patent and which is hereby expressly incorporated by reference herein. Generally speaking, however, safety logic modules can be created from module template objects stored in a configuration library and adapted so as to be used in a particular safety logic solver to perform safety functions with respect to particular safety field devices within the process plant 10. To create a safety logic module, a safety engineer may copy a particular control template (which may be used to create both process control modules run in process controllers as well as safety logic modules run in safety logic solvers) to create a particular safety logic module and may assign that safety logic module to a particular safety element, such as to one of the safety logic solvers, by dragging and dropping that safety logic module under an indication of the safety logic solver within the configuration display screen 83 of FIG. 2. In implementing the disclosed system, a new user role of safety engineer is created. When configuring the safety system, the configuration engineer who manages the process control portion may not have the appropriate privileges to configure safety modules, and thus configuration of the safety modules will be carried out by the safety engineer. Thus, security within the system will allow for the delineation of separate safety engineers and process configuration engineers.

C. Example Communication Techniques Utilized by the Process Control System and Safety System FIG. 3 illustrates the communication connections within and between the nodes 18 and 20 of the process plant 10 in more detail, including the communication connections between and within devices in the process control system 12 and the safety system 14 shown in FIG. 1.

Figure 3:
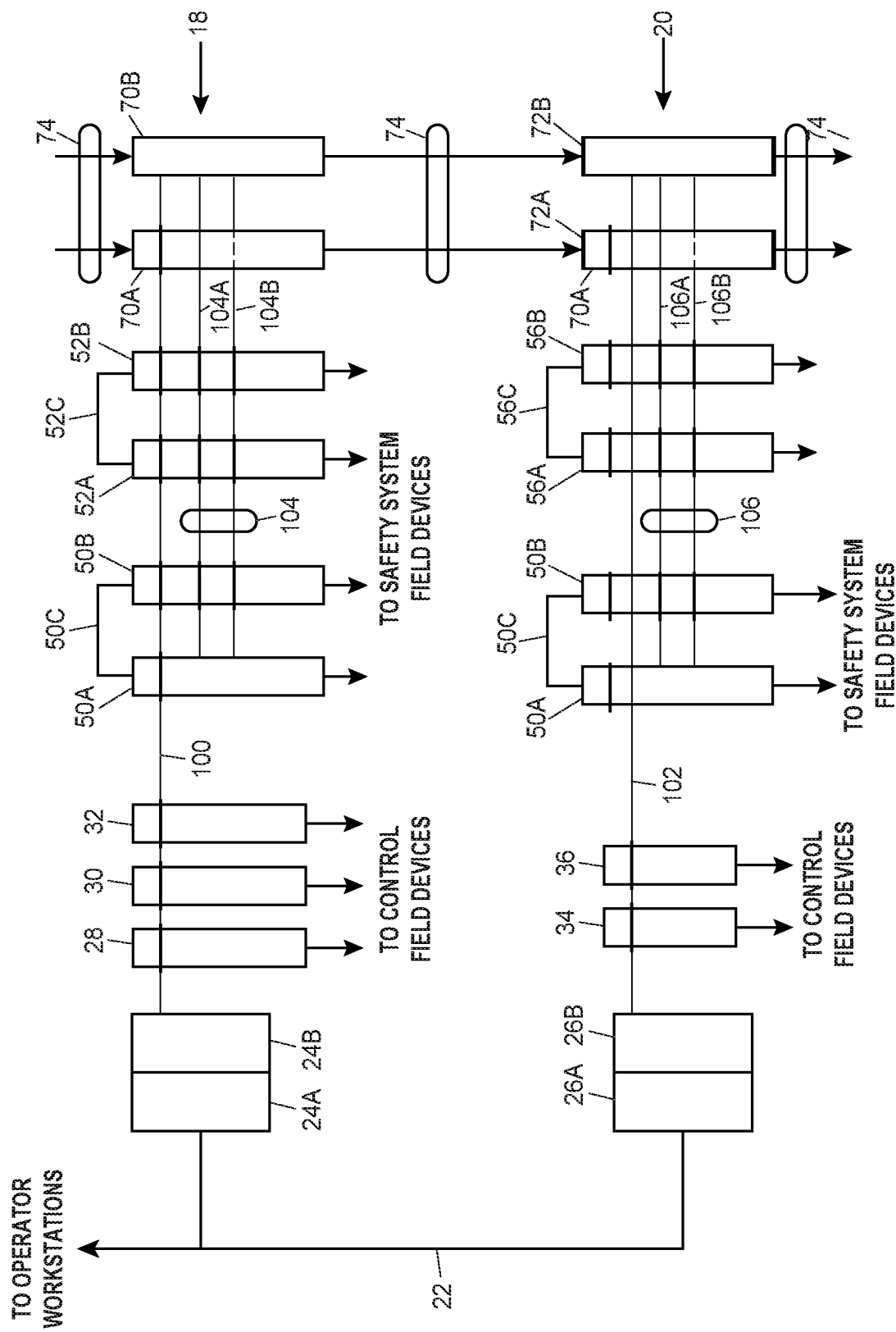
FIG. 3 illustrates the communication connections within and between nodes of the process plant in more detail, including the communication connections between and within devices in the process control system and the safety system shown in FIG. 1.

Generally speaking, the components of FIG. 1 that are illustrated in FIG. 3 are referred to the by same reference numerals. However, each of the controllers 24 and 26 is illustrated in FIG. 3 as a redundant controller pair 24A, 24B and 26A and 26B which may use any standard redundancy techniques. Likewise, each of the safety logic solvers 50-56 is illustrated as a pair of devices having a primary safety logic solver 50A, 52A, 54A, and 56A and a secondary safety logic solver 50B, 52B, 54B and 56B in each pair. As will be understood, each of the pair of safety logic solvers 50-56 is connected to safety field devices (not illustrated in FIG. 3) and may store the same safety logic modules 58 for use in performing safety functions within the safety system 14. Each pair of safety logic solvers 50-56 includes a dedicated bus 50C, 52C, 54C and 56C connected between the primary and secondary logic solvers to provide control communications between the logic solver pair. The primary and secondary safety logic solvers preferably are running and performing calculations at the same time, and the outputs of these two devices may be communicated to each other and confirmed via the appropriate buses 50C, 52C, 54C and 56C. If desired, the primary device may include voting logic that determines the output of the pair of safety logic solvers based on the output of both of the primary and secondary devices. Alternatively, any desired or known redundancy techniques may be used for the pairs of logic solvers 50-56. Moreover, each of the MPDs 70 and 72 is illustrated as a redundant pair of devices 70A, 70B and 72A, 72B with the MPDs of the different nodes 18 and 20 being connected with a redundant pair of inter-node communication lines or buses 74. While the communication interconnections between only two nodes 18 and 20 are illustrated in FIGS. 1 and 3, it will be understood a single or a redundant pair of MPDs may be located in any number of different nodes of the process plant 10 and may be connected with each other in a ring type bus structure to provide inter-node communications in any desired manner. Because a ring bus communication structure is generally (although not necessarily) used, the MPDs of the first node will be connected to the MPDs of the second node, which will be connected to the MPDs of the third node, and so on, with the MPDs of the last node being connected to the MPDs of the first node, all via the ring bus 74. If only two nodes exist in the process plant 10, such as illustrated in FIG. 1, the bus 74 coming out of the MPDs 72A and 72B of the node 20 will be connected directly to the inputs of the MPDs 70A and 70B of the node 18.

In addition to illustrating the connection between the controllers 24 and 26 and the workstations of FIG. 1, FIG. 3 illustrates the backplanes 76 in more detail. In particular, at the node 18, the controllers 24A and 24B are connected to the I/O devices 28, 30 and 32, to the redundant pairs of safety logic solvers 50A, 50B and 52A, 52B and to the redundant pair of the MPDs 70A and 70B via a railbus communication connection 100 which is preferably disposed in the backplane 76. In the same manner, at the node 20, the controllers 26A and 26B are connected to the I/O devices 34 and 36, to the pairs of safety logic solvers 54A, 54B and 56A, 56B and to the redundant pair of the MPDs 72A and 72B via a railbus communication connection 102 disposed in the backplane 76. The controllers 24 and 26 use the railbus connections 100 and 102 to provide communications between the workstations 14 on the one hand and the I/O devices 28, 30, 32, 34 and 36 and the safety system logic solvers 50, 52, 54, 56, 70 and 72 on the other hand, as well as to provide communications between the I/O devices 28, 30, 32, 34 and 36 on the one hand and the safety system logic solvers 50, 52, 54, 56, 70 and 72 on the other hand. In other words, the railbus lines 100 and 102 are used as the communication network that enables the safety system devices to be integrated with the process control system devices at a higher level within the process plant 10 so that the same configuration applications and display applications disposed within the workstations 14 may communicate with, configure and display information from both the process control system devices and the safety system devices.

Additionally, as illustrated with respect to the node 18, the backplane 76 includes a primary peer-to-peer (P2P) bus 104A that connects each of the safety system logic solvers 50 and 52 to the primary MPD 70A while a secondary P2P bus 104B connects each of the safety system logic solvers 50 and 52 to the secondary MPD 70B. The primary and secondary P2P buses 104A and 104B are local P2P buses which provide local communications between the safety logic solvers within a single backplane 76 as well as to the MPD 70 associated with or connected to that backplane 76. In a similar manner, the node 20 includes a primary peer-to-peer (P2P) bus 106A that connects each of the redundant pairs of safety system logic solvers 54 and 56 to the primary MPD 72A while a secondary P2P bus 106B connects each of the redundant pairs of safety system logic solvers 54 and 56 to the secondary MPD 72B. The primary and secondary P2P buses 106A and 106B are local P2P buses that provide local communications between the safety logic solvers and the MPD 72 within the backplane 76 of the node 20. As will be understood, the local primary and secondary P2P buses 104A, 104B, 106A, 106B provide redundant communication paths between all the safety related logic solvers 50-56 on the respective backplanes 76. If desired, the local P2P buses 104 and 106 may operate as broadcast buses, in that each safety logic solver and MPD device connected to the bus receives the transmissions of all the other devices on that bus, and only one device can transmit at a time. Of course, while FIG. 3 illustrates two safety logic solvers connected to each of backplanes 76 in the different nodes 18 and 20, any desired number of safety logic solvers, which may be redundant pairs of logic solvers or stand-alone logic solvers, may be connected to the backplane 76 (and thereby connected to the local P2P bus 104 or 106) at each of the nodes 18 and 20.

If desired, the safety logic solvers may share the local P2P bus media using a time division multiple access (TDMA) methodology in which all the local safety logic solvers on a particular backplane are synchronized with each other. In one case, the local P2P buses 104 and 106 may use an RS485 Manchester encoded HDLC protocol with a throughput of, for example, 2 Mb/sec. This Manchester encoding scheme causes the wire to be driven at 4 Mb/s. The given rates are exemplary only, as other suitable rates and encoding schemes may be chosen as well. Furthermore, if desired, each of the local safety logic solvers on a particular backplane may determine or be assigned its transmission time slot within the TDMA scheme used on the backplane 76 based on its physical location in the backplane 76, which reduces the number of configuration steps needed to set up the backplane 76 at a particular node. Still further, the primary and secondary P2P buses 104 and 106 of the backplanes 76 may support any desired message types and the physical interconnections for the local P2P buses 104 and 106 may reside within the backplane 76.

The remote P2P buses 74 preferably use a ring topology to allow data to be communicated between safety logic solvers located at different nodes of the process plant 10 and, therefore, disposed on different backplanes 76. The MPDs 70 and 72 are responsible for propagating messages around the ring made up by the remote P2P bus 74, for placing messages directed from a safety logic solver on the same backplane as the MPD 70 or 72 to the ring 74 and for forwarding the messages which are on the ring 74 and addressed to a safety logic solver on the same backplane as an MPD 70 or 72 to that safety logic solver. While any number of messages may be propagated on the remote P2P bus 74, one embodiment provides a maximum of thirty two (32) messages to be propagated during any P2P bus cycle. These messages can originate from 1 to 32 separate and distinct safety logic solvers, including the safety logic solvers 50-56 on the backplanes 76 of the nodes 18 and 20, as well as any other backplanes at other nodes in the process plant 10 interconnected by the ring bus 74. As a result of this operation, however, all of the safety logic solvers in the safety system 14 may operate synchronously, even when they are located at different nodes, because the ring bus 74 provides a communication interconnection between these devices which enables synchronization to be accomplished. The ring bus 74 may use and desired type of bus structure and protocol, but preferably uses point-to-point fiber optic cables and a 10BaseT Ethernet protocol, which has a throughput of about 10 Mb/s.

II. Example Safety Loop

Figure 4:
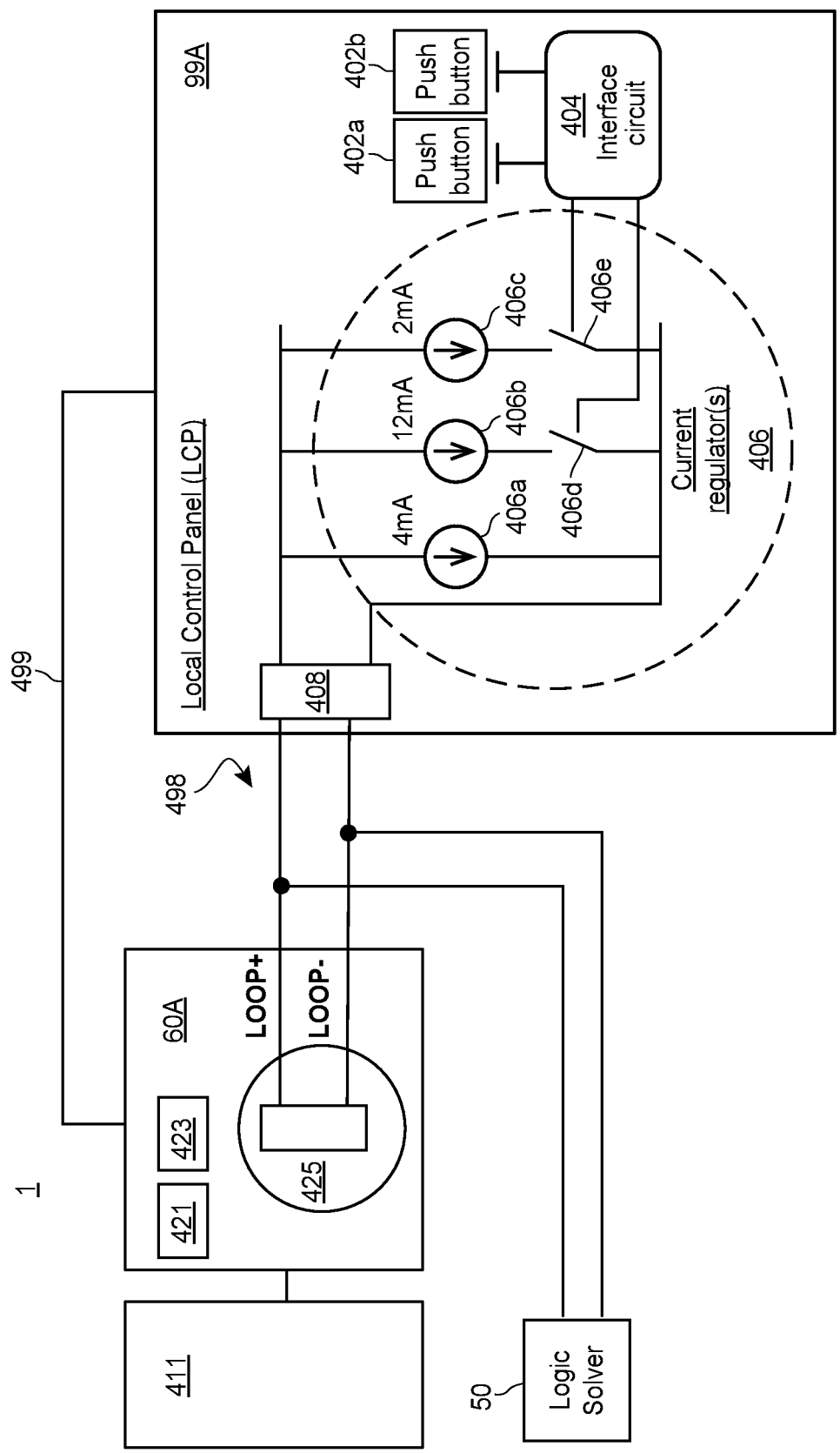
FIG. 4 is a block diagram of the LCP and the safety loop shown in FIG. 1.

FIG. 4 is a block diagram of the LCP 99A and the safety loop 1 shown in FIG. 1 (including a safety valve 411, as well as the SVP 60A and the logic solver 50 shown in FIG. 1). Generally speaking, the safety loop 1 includes an electrical link or connection 499 configured to carry a current signal (e.g., 4-20 mA) to which the SVP 60A is responsive (e.g., wherein a current level within a particular range represents a particular desired valve position, a current level within another range represents a command to trip; a current level within yet another range represents a command to reset; etc.).

As shown, the LCP 99A may be coupled to the safety loop 1 to enable manipulation of loop current on the safety loop 1, thereby enabling the LCP 99A to manipulate signals received via the safety loop 1 by the SVP 60A. Generally speaking, the signal carried by the safety loop 1 is a current signal (e.g., 4-20 mA) wherein the level of current (sometimes called a "current signal" or a "loop current") on the safety loop is varied by the logic solver 50 to cause the SVP 60A to reposition the valve 411.

Note, while the methods and techniques described herein regarding the functionality of the LCP 99A reference the ability of the LCP 99A to trigger functionality of the SVP 60A by manipulating a loop current of the safety loop 1, it will be appreciated that the LCP 99A may manipulate the loop current of any suitable safety loop for any suitable valve positioner (e.g., analog) that is configured to operate based on a current signal (e.g., a 4-20 mA signal). That is, the techniques described herein regarding the LCP 99A's ability to trigger functions of the SVP 60A can also be applied to enable the LCP 99A (or any similarly configured control panel consistent with disclosed designs and techniques) to trigger functionality of any suitable digital or analog valve positioner that operates based on a loop current level (because the LCP 99A accomplishes such triggering by way of loop current manipulation). Such valve positioners may have one or more circuits (e.g., including a permanent circuit such as an ASIC or a microprocessor) configured to receive a current signal (e.g., 4-20 mA) and to drive a valve based on the current signal.

The safety loop 1 includes the logic solver 50 coupled to the SVP 60A for a safety valve 411 (which may be any suitable safety valve). The logic solver 50 is configured to transmit control signals to the SVP 60A in order to cause the SVP 60A to drive the safety valve 411 to a desired position. In a typical example, the logic solver 50 determines the valve 411 should either be in a "normal state" (e.g., in response to determining that no trip conditions exist) or a "safe state" (e.g., in response to determining that a trip condition exists). The "safe state" may be "open," "closed," or any other desired predetermined failsafe position, depending on the configuration of the process. Example trip conditions include overpressure of a pressure tank or an overheated process.

As shown, the LCP 99A and the SVP 60A may be communicatively connected via a digital link 499 in some embodiments. This link 499 is distinct from the electrical connection 498. Generally speaking, each of the SVP 60A and the LCP 99A may transmit and receive information between each other via the link 499. Generally, any safety related command transmitted via the link 499 must be assessed and rated according to safety standards before it can be properly implemented in a plant environment. As previously noted, the disclosed techniques that enable the LCP 99A to trigger tripping functionality of the SVP 60A via manipulation of a loop current do not necessitate such assessment and rating beyond those already performed with respect to the SVP 60A. In some embodiments, the link 499 may not exist. For example, the LCP 99A may be electrically connected (e.g., via a link such as the link 498) to a safety loop including an analog valve positioner (not shown) or a digital valve positioner (such as the SVP 60A) without establishing a digital link between the two.

The SVP 60A is a digital valve controller or positioner configured to adjust a valve such as the valve 411. The SVP 60A includes a memory 421, a processor or microprocessor 423 configured to execute one or more sets of instructions stored to the memory 421, and a communication interface 425 configured to: (i) receive from a control system (e.g., the logic solver 50 and safety system 14) communication signals conforming to one or more process control or plant communication protocols and standards (e.g., traditional 4-20 mA signaling or HART), and (ii) transmit to a valve (e.g., the valve 411) a SVP-to-valve output signal to adjust a position of the valve and/or receive from the valve a valve-to-SVP input signal (sometimes referred to as a "feedback signal") indicating a position of the valve. The communication interface 425 may be that of a conceptual grouping of two distinct components or interfaces (e.g., including a first interface coupled to the safety system 14 to transmit and receive 4-20 mA signals and/or digital signals, and a second interface coupled to the valve 411 to transmit pneumatic output signals to drive the valve 411).

The signal received by the SVP 60A from the logic solver 50 may be referred to as a "loop current," a "SVP loop input current," "SVP input signals," etc. In some embodiments, the SVP 60A may transmit messages to the logic solver via a digital signal superimposed on the 4-20 mA signal received by the SVP 60A (e.g., conforming to HART standards). The digital output messages transmitted by the SVP 60A to the logic solver 50 may be referred to as "SVP loop output signals," "SVP output messages," etc. Similarly, signals transmitted by or received at the SVP 60A from the valve 411 may be referred to as "SVP-to-valve output signals" and "valve-to-SVP input signals," respectively.

At a high level, a "valve positioner" or "positioner" such as the SVP 60A is an interpreter between the control valve body (e.g., the valve 411) and the safety system (e.g., the safety system 14). Generally speaking, the SVP 60A relies on two signals for proper operation: an input signal (typically an output control signal from the safety system 14) and a feedback signal (a detected valve position for the valve 411). In an embodiment, the SVP 60A translates control signals from the safety system 14 (e.g., from the logic solver 50) and adjusts an air supply to an actuator of the valve assembly 411, which moves the valve 411 to the position requested by the safety system 14. The SVP 60A may also take position feedback from the valve stem/shaft of the valve 411 and send that information back to the safety system 14.

In a typical example, the SVP 60A is a smart valve positioner or controller rather than a traditional valve positioner. Unlike traditional valve positioners, which rely on pneumatic input signals (representing a setpoint) to control the delivery of pressurized air (i.e., the pneumatic output) to a valve actuator (e.g., rather than a processor or computer-based system), a "smart" valve positioner or controller performs the same basic functions as a traditional valve positioner, but it has expanded functionalities. The International Society of Automation (ISA) does not differentiate between traditional and smart positioners in its standards. Like typical "smart" devices, a smart valve positioner or controller includes one or more processors that enable additional capabilities when compared to traditional valve positioners. A smart valve positioner is sometimes called a "SVP," "smart positioner," a "valve controller," a "smart valve controller," a "digital valve controller," or "DVC."

As noted, the SVP 60A is a processor microprocessor-based positioner that is compatible with a variety of communication protocols, including HART, FOUNDATION fieldbus, and PROFIBUS. The processor 423 enables diagnostics and two-way communication with the logic solver 50 to simplify setup and troubleshooting. Note, positioners relying only on traditional 4-20 mA signals for communication with a control system often cannot transmit signals back to the control system, or need a second dedicated 4-20 mA link for positioner-to-control system signaling. This is because traditional non-HART 4-20 mA links are capable of carrying a single one-way signal. By contrast, the SVP 60A can utilize HART, which enables digital signals to be superimposed on a 4-20 mA signal, thereby enabling two-way digital communication via a single 4-20 mA loop.

In any event, in typical operation, the SVP 60A receives a control signal from the safety system 14 (e.g., from the logic solver 50), which is read by the processor 423, processed via a digital algorithm stored to the memory 421, and converted into drive current signal, which is then converted into a pneumatic output signal by a current-to-pressure ("I/P") converter (e.g., part of the communication interface 425) to drive the valve 411 to a desired position. Unlike traditional pneumatic positioners, which typically rely on a mechanical beam, cam, and flapper assembly to drive a pneumatic output, the processor 423 of the SVP 60A executes instructions (e.g., embodied by machine readable instructions or circuitry) representing a position control algorithm to drive a current signal that is converted to the SVP output which drives the valve 411.

Because the SVP 60A is a "smart" controller or positioner, it offers numerous advantages over traditional positioners. For example, it offers more accurate and reliable positioning functionality. Further, when using multiple positioners like the SVP 60A, every such positioner can be calibrated in the same manner and maintained in the same manner, which provides more accurate control to setpoints and thus improved control compared to traditional positioners. Further, the SVP 60A enables accurate calibration. For example, users may specify an input signal for the SVP 60A with a larger range than necessary to compensate for inaccurate positioner calibration. In the case of analog 4-20-mA inputs, users may drop the input to well below 4 mA and then adjust it to exceed 20 mA to ensure the valve shuts off and travels from 0% to 100%.

Additionally, the SVP 60A may feature diagnostics that provide insight into the valve's performance. These diagnostics may include in-service and out-of-service diagnostics. Typical in-service diagnostics include monitoring, friction analysis, troubleshooting, and air consumption tests. Monitoring diagnostics indicate important parameters such as air pressure, input setpoint, valve travel, and other values critical to operation. A friction analysis can be done while the valve 411 is in operation to determine the amount of friction present in the valve assembly; excessive friction can make the valve 411 more difficult to control. Air consumption tests can be conducted to determine whether the valve 411 is using an excessive amount of air. Excessive air usage can be caused by wear or damage to the pressure-retaining portions of the actuator assembly and/or to the instrument tubing. All of these non-intrusive in-service diagnostics can highlight a failure or performance degradation and alert an operator that it is time to schedule maintenance on the assembly.

Out-of-service diagnostics may include valve signatures and step-response tests. A valve signature is a graphical representation of the relationship between the actuator pressure input and valve position while the valve 411 is slowly opened and closed. The data from the valve signature can be used to calculate spring settings, spring rate, valve friction, and valve closure forces. Step-response tests move the valve 411 in predetermined increments and measure the actual valve travel in response to the input to the SVP 60A, which helps to evaluate valve performance, calibration accuracy, positioner tuning, and stroking speed.

The SVP 60A may be configured to "trip" when a "trip condition" exists. Generally speaking, the term "trip" refers to a safety function triggered by an abnormal or undesired condition (e.g., a "trip condition"). The safety function may involve placing the valve 411 in a "failed" or "tripped" or "safe state." Generally speaking, the SVP 60A remains in a tripped state until it is reset, regardless of whether or not the trip condition remains (though this relationship could be configured such that removing the trip condition resets the device in question, if desired).

The SVP 60A may be configured in a de-energize to trip (DETT) configuration or an energize to trip (ETT) configuration, either of which may meet the systematic integrity requirements of SIL 3. In either scenario, the logic solver 50 may be configured to account for a 4 mA power draw by the LCP 99A by supplying an additional 4 mA (or any other desired current equivalent to the LCP power draw) more than a desired loop current. For example, in order to achieve a 4 mA loop current, the logic solver 50 may supply a current of 8 mA to the safety loop 1. Said another way, "loop current" is generally understood from the perspective of the SVP 60A.

In a typical DETT configuration, the logic solver 50 may be configured to transmit a "baseline" loop current during normal operation of approximately 20 mA (indicating that no abnormal conditions exist to initiate a trip). The SVP 60A may be configured to interpret the loop current entering a "trip range" below the "baseline" (e.g., 0-11 mA) as a trip command, which causes the SVP 60A to move the valve 411 to its safe state (e.g., the logic solver 50 may transmit 4-15 mA in such a configuration when attempting to trip the SVP 60A to account for the 4 mA LCP power draw). Likewise, the SVP 60A may be configured to detect any suitable number of current ranges as a signal to initiate some other functionality, such as a stroke test. For example, a loop current in a range between the "baseline" and the "trip range" (e.g., 13-15 mA) may represent a "stroke test range" that causes the SVP 60A to initiate a stroke test (e.g., the logic solver 50 may transmit 17-19 mA in such a configuration when attempting to initiate the stroke test to account for the 4 mA LCP power draw). Finally, a loop current in a range above the baseline (e.g., 20 mA or greater) may represent a "reset range" that triggers the SVP 60A to reset after a trip (e.g., the logic solver 50 may transmit 20 mA or more in such a configuration when attempting to reset the SVP 60A to account for the 4 mA LCP power draw).

In a typical ETT configuration, the logic solver 50 may be configured to transmit a "baseline" loop current during normal operation of approximately 8 mA, such that the LCP draws 4 mA for power and such that the SVP 60A draws 4 mA. In such a configuration, the SVP 60A may be configured to interpret the loop current entering a "trip range" higher than the baseline current (e.g., 13-20 mA) as a trip, which causes the SVP 60A to move the valve 411 to its safe state (e.g., the logic solver 50 mA may transmit 17 mA or more in such a configuration when attempting to trip the SVP 60A to account for the 4 mA LCP power draw). Likewise, the SVP 60A may be configured to detect any suitable number of current ranges as a signal to initiate some other functionality, such as a stroke test. For example, a loop current between the "baseline" and the "trip range" (e.g., 5-7 mA) may represent "stroke test range" that causes the SVP 60A to initiate a stroke test (e.g., the logic solver 50 mA may transmit 9-11 mA in such a configuration when attempting to initiate the stroke test to account for the 4 mA LCP power draw). Finally, a loop current in a range below the baseline (e.g., 4 mA or less) may represent a "reset range" that triggers the SVP 60A to reset after a trip (e.g., the logic solver 50 may transmit 8 mA or less in such a configuration when attempting to reset the SVP 60A to account for the 4 mA LCP power draw).

III. Example LCP

Staying with FIG. 4, the LCP 99A is a control panel configured to communicate with a valve positioner or controller such as the SVP 60A so that it can transmits commands to the positioner (e.g., to cause a trip, a reset, or a stroke test). The LCP 99A is typically a field-based panel, located at a position relatively proximate to the SVP 60A to thereby enable a person in the field (e.g., a person inspecting the SVP 60A) to have a degree of control over the SVP 60A if desired (e.g., enabling the person to trip or reset the SVP 60A). This "local" control may be desirable because it may enable the person to personally view the SVP 60A and the valve 411 as they respond to the commands enabled via the LCP 99A, thus enabling troubleshooting if the SVP 60A and/or the LCP 99A are not acting in an expected manner.

The LCP 99A is configured to couple to the safety loop 1 via a 4-20 mA link 498, thereby enabling the LCP 99A to manipulate the loop current in response to a user manually activating a trip command, thereby enabling the user to trip the SVP 60A in a manner consistent with safety standards. That is, the LCP 99A may be utilized to manipulate the loop current to initiate various functions of the SVP 60A that are triggered by the loop current entering ranges corresponding to the various functions (i.e., wherein the current ranges trigger particular functions of the SVP 60A). Below, the functionality of the LCP 99A is described with respect to a typical DETT configuration, but it will be understood that slightly different ranges may be utilized. Further, it will be appreciated that an ETT configuration with different ranges may be utilized.

The LCP 99A includes a user interface 402 including buttons 402a and 402b; an interface circuit coupling the interface 402 to a current regulator circuit 406; and a communication interface 408.

The user interface ("UI") 402 may include any desired input elements for detecting user input and/or output elements for providing information to a user. Example UI output components that may be included in the UI 402 include: (i) visual output components for providing visual output such as lights (e.g., LEDs) and electronic displays (e.g., LCD, LED, CRT, plasma, projection displays, heads-up displays, etc.), (ii) audio output components such as speakers for providing audio output, and (iii) motion generating components such as motors that provide haptic feedback. Example UI input components that may be included in the UI 402 include: (i) mechanical or electrical components for detecting physical or touch input, such as hardware actuators (e.g., those used for a mechanical push button) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Generally speaking, the interface circuit 404 functions as an interface between the UI 402 and the current regulator circuit 406 to "notify" the circuit 406 of user inputs or actuations received at the UI 402 (e.g., via changes in electrical signals transmitted to the circuit 406). The circuit 404 may be any suitable electrical circuit that electrically links the UI 402 to the current regulator circuit 406. In an embodiment, actuating one of the push buttons 402a/b closes or opens a circuit that causes a signal change (e.g., a current or voltage drop or rise), which thereby causes a corresponding switch in the current regulator circuit 406 (e.g., one of the switches 406d/e—described in more detail below) to change state (e.g., to close).

Generally speaking, the current regulator circuit 406 responds to signals from the interface circuit 404 (e.g., responsive to the UI 402) to supply additional current to the safety loop 1 or to draw additional current away from the safety loop 1, depending on the embodiment and configuration of the SVP 60A, to thereby cause the loop current for the safety loop 1 to enter a desired range that triggers a desired function of the SVP 60A (e.g., a trip function, a reset function, or a stroke test function).

The current regulator 406 may include any desired number of current supplies (to add current to the safety loop 1) or current sinks (to draw current from the safety loop 1), any one or more of which may be coupled to the remainder of the circuit 406 via one or more switches responsive to the interface circuit 404 (which is, in turn, responsive to the UI 402). As shown, the current regulator circuit 406 includes a 4 mA current sink 406a; a 12 mA current sink 406b connected to the circuit 406 via a switch 406d; and a 2 mA current sink 406c connected to the circuit 406 via a switch 406e.

In an example embodiment, in a default state, the sink 406a pulls 4 mA of current from the safety loop 1 to power the LCP 99A. As a result, the logic solver 50 is configured to supply current in a range of 8-24 mA so that the LCP 99A receives 4 mA in its default state and so that the DCV 60A receives a current signal of 4-20 mA. By supplying a minimum of 8 mA during normal operation, the logic solver 50 thereby avoids the loop current from dropping below 4 mA, which would trip the SVP 60A when it is using a DETT configuration. In some embodiments, the LCP 99A is powered via an external source and does not include the sink 406a. In such an embodiment, the logic solver 50 may provide a standard 4-20 signal to the safety loop during normal operation.

In any event, the switches 406d and 406e enable the LCP 99A to manipulate the loop current on the safety loop 1, thus enabling the LCP 99A to send a signal to the SVP 60A by causing the loop current to enter a particular range. For example, because the SVP 60A is configured to interpret a loop current of 4 mA or less as a trip message or a trip condition, the LCP 99A can trigger the trip functionality of the SVP 60A by causing the loop current to drop below 4 mA.

By default, the switches 406d and 406e are open, thus preventing the sinks 406b and 406c from pulling current from the safety loop 1. When a user pushes the button 402a, the interface 404 detects the push and responds by closing the switch 406e, thereby closing the circuit including the sink 406c and thereby resulting in the sink 406c pulling 2 mA of current from the safety loop 1. Similarly, when a user pushes the button 402b, the interface 404 detects the push and responds by closing the switch 406d, thereby closing the circuit including the sink 406b and thereby resulting in the sink 406b pulling 12 mA of current from the safety loop 1.

In an embodiment, the LCP 99A may also trip the SVP 60A via a digital command (e.g., transmitted via the digital signal superimposed on the 4-20 mA signal of a HART signal, or transmitted via a dedicated link such as the link 499 shown in FIG. 4). However, such a digital command may not be safety rated or approved, and thus may not be as desirable for implementation when compared to the current-manipulation technique mentioned above.

The communication interface 408 electrically couples the current regulator circuit 406 to the safety loop 1, and may include any suitable set of terminals, wires, or ports to enable the electrical connection. In some embodiments, the LCP 90A may trip the SVP 60A via both an electrical current manipulation (as described in detail herein) and via a digital command (e.g., transmitted via the link 499 shown in FIG. 4). This redundancy may reduce the likelihood that the LCP 99A fails to trip the SVP 60A when a trip condition occurs. That is, if the trip command fails to be communicated via one of the links 498 or 499 shown in FIG. 4, it may still be transmitted and received via the other link, ensuring that the SVP 60A receives the command and adjusts the valve to a safe state.

Figure 5:
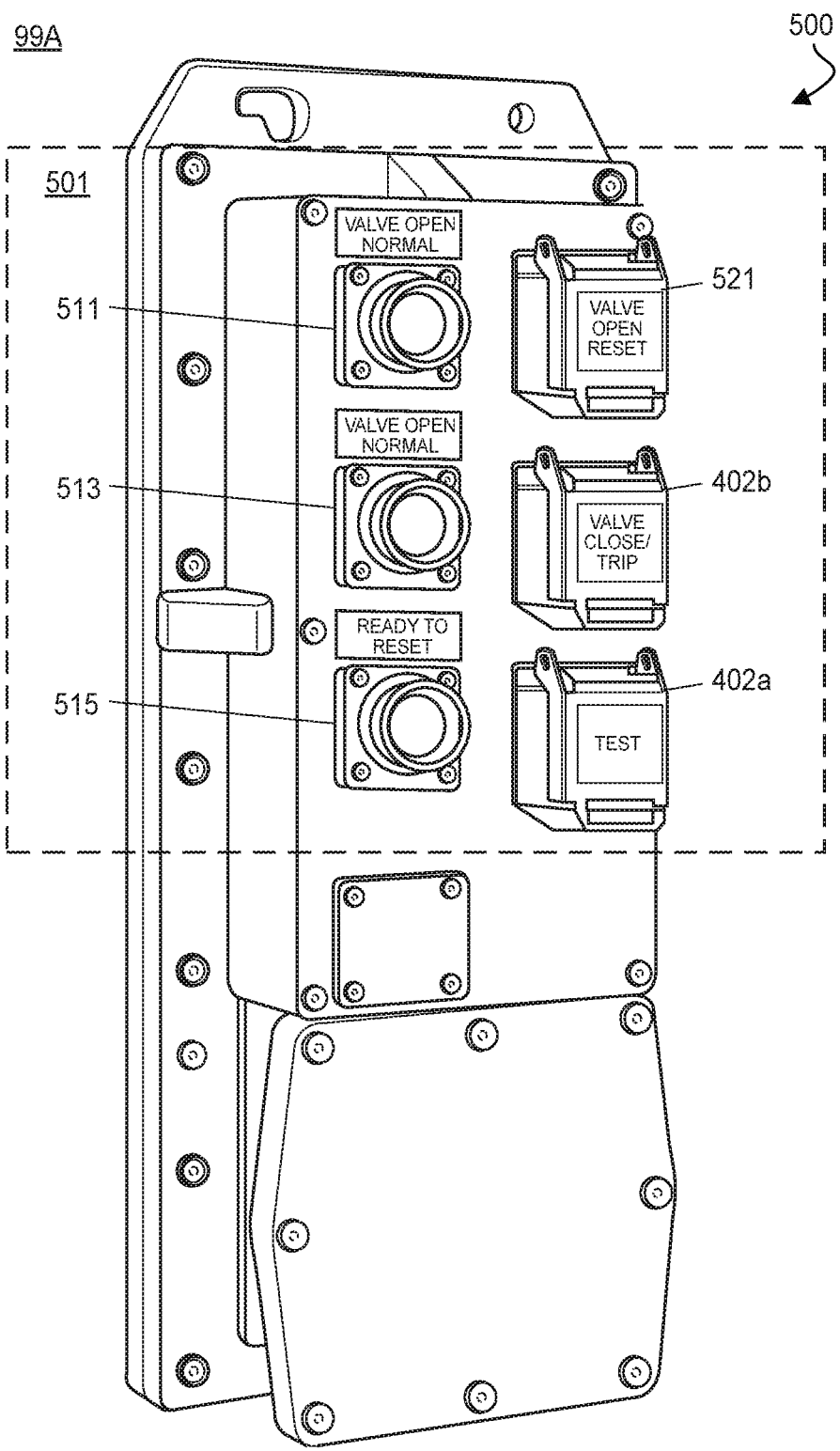
FIG. 5 depicts an example housing for a safety valve control panel such as the LCP.

FIG. 5 depicts an example housing 500 for a safety valve control panel such as the LCP 99A, according to an embodiment. As shown, the housing 500 includes a UI 501, which includes output elements 511, 513, and 515, and input elements 521, 402b, and 402a. In the shown embodiment, the output elements 511-515 are lights (e.g., LEDs). The output element 511 indicates when the valve 411 is in a normal state; the output element 513 indicates when the valve 411 is in a tripped or safe state; and the output element 515 indicates when the valve 411 is ready to reset (e.g., indicating the trip condition no longer exists). The output elements 511-513 may be driven by the circuit 404 and/or by a circuit (not shown) configured to receive and interpret digital signals superimposed on the safety loop 1 (e.g., by the SVP 60A and/or the logic solver 50). For example, the output elements 511 and 513 may be driven by digital messages transmitted by the DVP 60A to the LCP 99A.

In the shown embodiment, the input elements 521, 402a, and 402b are mechanical push-buttons that may be actuated by a user. As shown, the button 521 represents a "reset" command that causes the LCP 99A to draw or supply current to the safety loop 1 sufficient to cause the SVP 60A to trigger a reset function to thereby return to normal operation. The button 402b represents a "trip" command that causes the LCP 99A to draw or supply current to the safety loop 1 sufficient to cause the SVP 60A to trigger a trip function to thereby place the safety valve 411 in a tripped or safe state. And the button 402a represents a "test" command that causes the LCP 99A to draw or supply current to the safety loop 1 sufficient to cause the SVP 60A to trigger a test function in which the SVP 60A performs a stroke test of the valve 411.

IV. Example Methods

Figure 6:
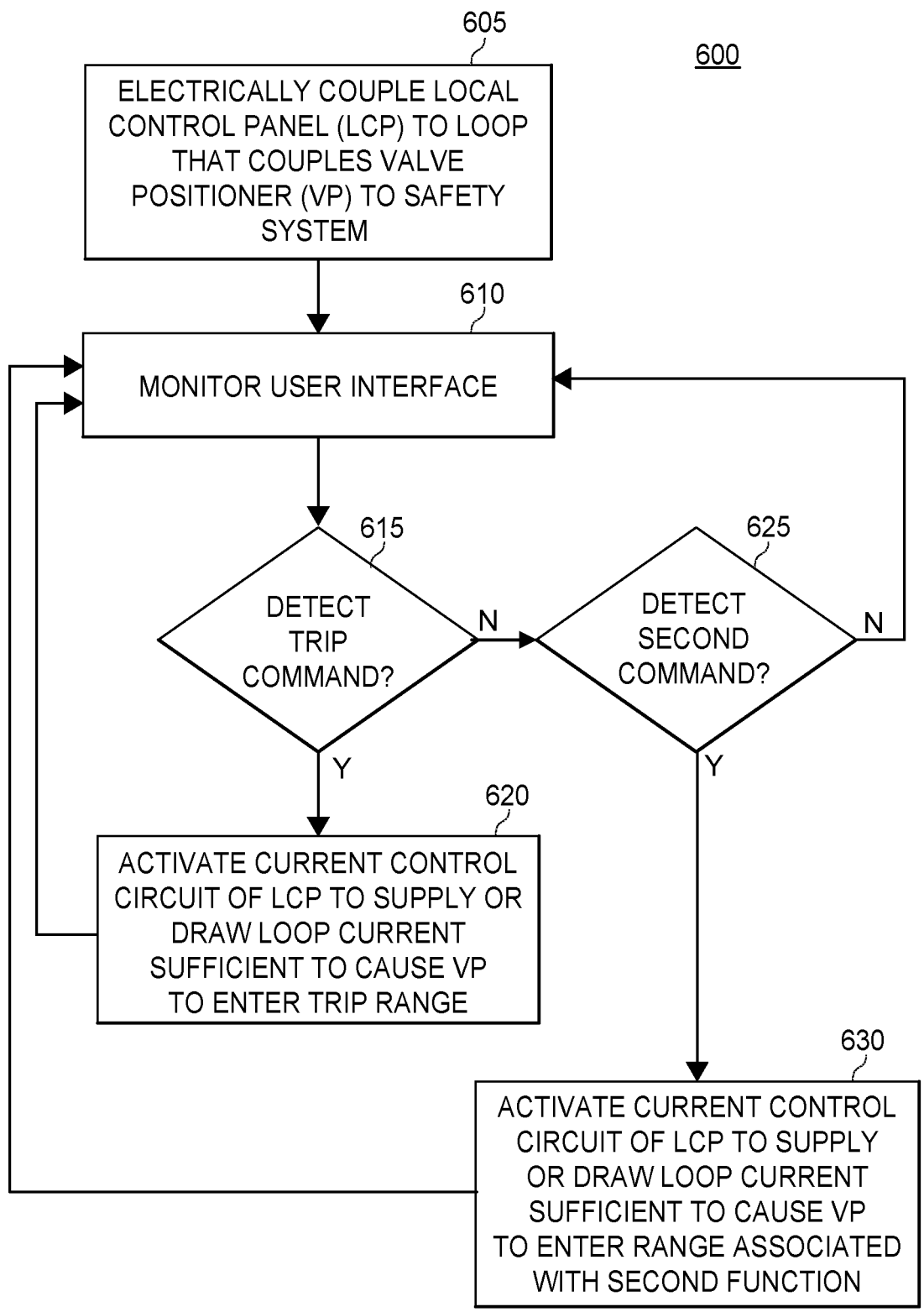
FIG. 6 is a flow chart for an example method for manipulating a loop current for a positioner, such as the valve positioner shown in FIGS. 1, 4, and 5, in order to initiate a trip functionality of the positioner that the positioner triggers in response to the loop current entering a particular range.

FIG. 6 is a flow chart for an example method 600 for manipulating a loop current for a positioner, such as the SVP 60A, in order to initiate a trip functionality of the positioner that the positioner triggers in response to the loop current entering a particular range. The method 600 may be implemented, in whole or in part, by the LCP 99A shown in FIGS. 1, 4 and 5, and may be implemented via a set of circuits (e.g., of the LCP 99A) that are permanently or semi-permanently configured to perform the method 600. In an embodiment, the method 600 may be embodied by a set of instructions or routines that are stored to memory and executable by a processor to implement the functionality of the method 600. Note, while the discussion below describes the method 600 with reference to the structure shown in FIGS. 1-5 (e.g., the LCP 99a), it will be appreciated that the method 600 may be implemented with any suitable control panel configured to be coupled to a loop of any suitable positioner.

The method 600 begins at a step 605. At the step 605, the LCP 99A is electrically coupled to the safety loop 1 (which couples the SVP 60A to the logic solver 50), or any other suitable safety loop in a safety system that couples a suitable valve positioner to the safety system. The safety loop 1 may carry a 4-20 mA signal. In some instances, the safety loop 1 may carry a digital signal superimposed on the 4-20 mA signal (e.g., in accordance with the HART protocol).

At a step 610, the LCP 99A monitors the user interface 402 to detect a user's actuation of a user interface element such as a push button (e.g., one of the push buttons 402a or 402b shown in FIG. 4).

At a step 615, the LCP 99A determines whether or not a trip command has been detected at the user interface 402 (e.g., via detecting that a "trip button" has been actuated). If a trip command is detected, the LCP 99A proceeds to a step 620 to handle the trip command. Otherwise, the LCP 99A proceeds to a step 625 (discussed below).

At the step 620, the LCP 99A activates a current control or regulator circuit (e.g., the circuit 406 shown in FIG. 4) to supply or draw current from the safety loop 1 sufficient to cause the loop current to enter a "trip range" for which the SVP 60A is configured to respond by initiating a trip. For example, when the SVP 60A is configured for a DETT configuration, the LCP 99A may close the switch 406e shown in FIG. 4 to draw an additional 12 mA of current from the safety loop. Accordingly, when the solver 50A is supplying a baseline current of 16 mA, the LCP 99A may draw 16 mA of current (e.g., via the current sinks 406a and 406b), dropping the loop current to 0 mA. The SVP 60A may respond to detecting the loop current enter a trip range (e.g., 0-11 mA) by tripping the safety valve 411.

At a step 625, the LCP 99A determines whether or not a second command, such as a reset command or a strike test command, has been detected at the user interface 402. If a second command has been detected, the LCP 99A proceeds to a step 630. Otherwise, the LCP 99A proceeds to the step 610 to continue monitoring the user interface 402.

At the step 630, the LCP 99A activates a current control or regulator circuit (e.g., the circuit 40 shown in FIG. 4) to supply or draw current from the safety loop 1 sufficient to cause the loop current to enter a second range for which the SVP 60A is configured to respond by initiating a second function. The second function may be a reset function (e.g., a loop current of 16 mA or greater or 20 mA or greater, depending on the embodiment) or a stroke test range (e.g., a loop current of 13-15 mA). To cause the loop current to enter a "reset range," the LCP 99A may activate a current supply (not shown in FIG. 4) to add sufficient current to the safety loop 1. To cause the loop current to enter a "stroke test range," the LCP 99A may activate a current sink (e.g., the current sink 406c) to cause the loop current to drop below its baseline current into the "stroke test range." After activating the current regulator circuit to trigger the second command, the LCP 99A may return to the step 610 to continue monitoring the user interface.

Figure 7:
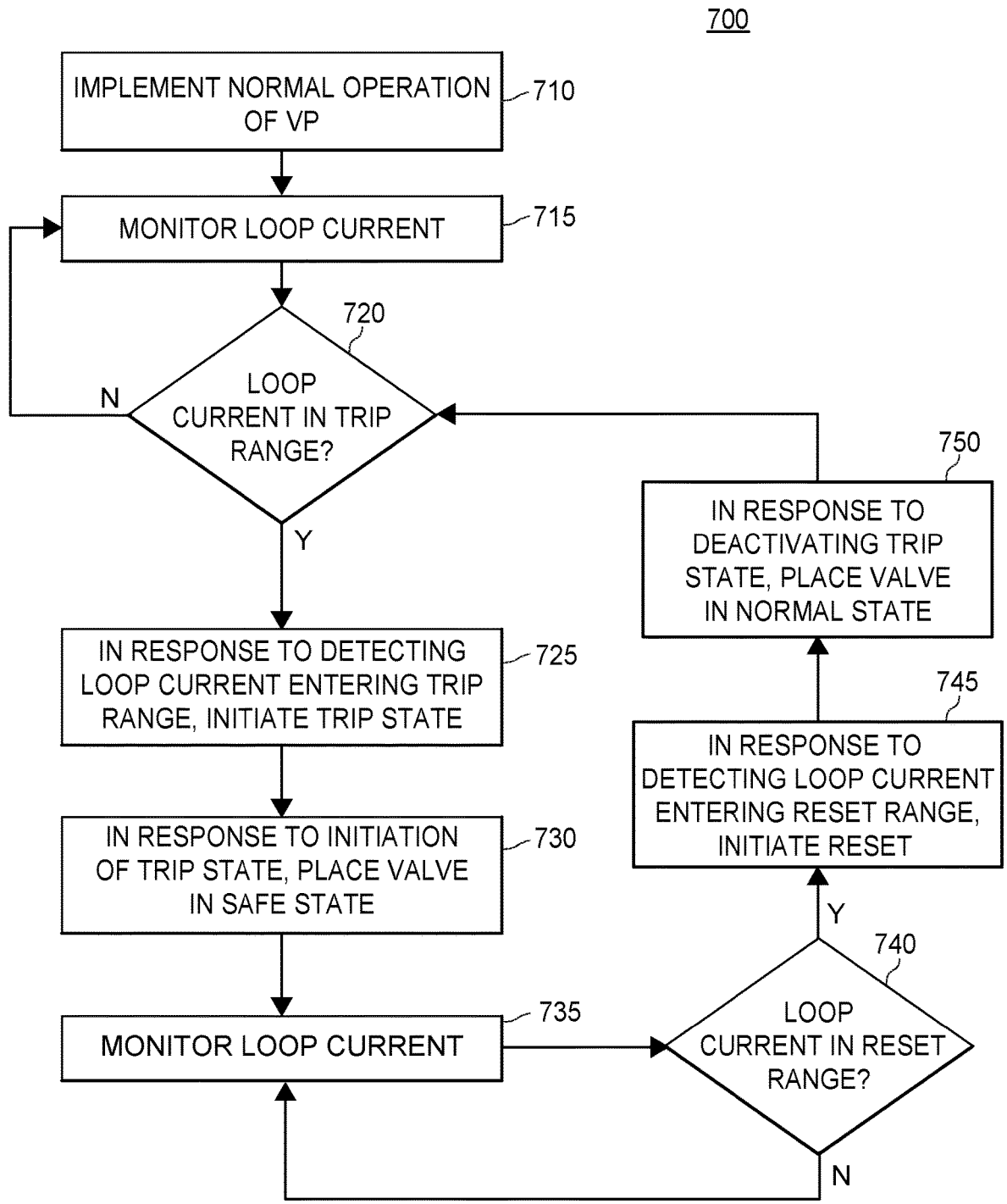
FIG. 7 is a flow chart for an example method for operating a positioner such that it initiates trips and resets in response to a loop current entering a trip range and a reset range, respectively.

FIG. 7 is a flow chart for an example method 700 for operating a positioner such that it initiates trips and resets in response to a loop current entering a trip range and a reset range, respectively. The method 700 may be implemented, in whole or in part, by the SVP 60A shown in FIGS. 1, and 4, and may be implemented via a set of circuits (e.g., of the SVP 60A) that are permanently or semi-permanently configured to perform the method 700. In an embodiment, the method 700 may be embodied by a set of instructions or routines that are stored to a memory (e.g., the memory 421 of the SVP 60A shown in FIG. 4) and executable by a processor (e.g., the processor 423) to implement the functionality of the method 700. Note, while the discussion below describes the method 700 with reference to the structure shown in FIGS. 1-5 (e.g., the SVP 60A), it will be appreciated that the method 700 may be implemented with any suitable any suitable valve controller or positioner.

Note, in the context of the method 7, it will be understood that references to a "loop current" detected by the SVP 60A refer to a SVP input loop current. In a traditional configuration, a single entity (e.g., the logic solver 50) acts as the single source of loop current, which a field device detects to determine a command based on the current level. However, with the disclosed embodiments, the LCP 99A may also supply or draw current from the safety loop 1. Thus, the DVC input loop current (i.e., the loop current detected by the SVP 60A) may be different than the current supplied by the logic solver 50 because the LCP 99A may draw or supply loop current, depending on the embodiment.

In any event, the method 700 starts at a step 710 in which normal operation of the SVP 60A (or any other suitable valve positioner or digital valve controller) is implemented.

Generally speaking, the SVP 60A is coupled to the safety loop 1 during normal operation, which couples the SVP 60A to the logic solver 50 and the safety system 14.

At a step 715, the SVP 60A monitors the loop current on the safety loop 1. Generally speaking, the current on the safety loop represents a signal for the SVP 60A, and the SVP 60A is configured to initiate different functions (e.g., positioning the valve 411 in a desired position) in response to the loop current being a corresponding level or within a corresponding range.

At a step 720, the SVP 60A determines whether or not the loop current of the safety loop enter has entered a "trip range." In response to determining that the loop current has not entered a "trip range," the SVP 60A returns to the step 715.

Note, in some embodiments, the SVP 60A may, after determining that the loop current has not entered the "trip range," proceed to a step (not shown) in which it determines whether or not the loop current has entered a second range associated with a second command, such as a stroke test command. In such embodiments, the SVP 60A responds to detecting that the loop current has entered this second range (e.g., 13-15 mA) by initiating the stroke test.

At a step 725, the SVP 60A responds to detecting the loop current entering a trip range by initiating a trip. Example trip ranges were discussed above with reference to FIG. 3.

At a step 730, the SVP 60A responds to the initiation of the trip by placing the valve 411 in a safe state. The safe state may be a 100% open, 0% open, 50% open, or any other desired predetermined position that is chosen as a failsafe position. If the SVP 60A is unable to successfully position the valve 411 in a safe state, it may generate an alarm. In some instances, the safety valve 411 may already be in a safe state when a trip occurs, and thus may not require repositioning. In any event, when SVP 60A confirms that valve has reached the safe state, it proceeds to a step 735. In some embodiments, the SVP 60A proceeds to the step 735 before confirming that the valve 411 has reached the safe state (or without confirming it has reached the safe state at all).

In some instances, placing the valve 411 in a "safe state" includes precluding the logic solver 50 and/or safety system 14 (and/or any other device, system or user, if desired) from changing the position of the valve 411 away from the safe state position. For example, the SVP 60A may activate an interlock that prevents moving the valve 411, and the interlock may stay active until particular conditions are met (e.g., an explicit reset command is detected), regardless of whether the loop current exits the trip range. The interlock may be a "soft" interlock (e.g., in which a bit stored to a memory of the SVP 60A, representing the interlock, is set to "1" to indicate the interlock is activate). In such an example, so long as the interlock bit or flag is set to "1," the SVP 60A prevents manipulation of the valve position (e.g., thus preventing the valve 411 from moving away from its predetermined safe state or failsafe position).

At the step 735, the SVP 60A continues to monitor the loop current and then proceeds to a step 740.

At the step 740, the SVP 60A determines whether or not the loop current has entered a reset range. Example reset ranges are discussed above with reference to FIG. 3. In response to determining that the loop current has not entered a reset range, the SVP 60A returns to the step 635. In response to detecting that the loop current has entered a reset range, the SVP 60A proceeds to a step 745.

At the step 745, the SVP 60A initiates a reset in response to detecting a loop current in the reset range at the step 740 and proceeds to a step 750.

At the step 750, the SVP 60A responds to the initiation of the reset by positioning the valve 411 in the "normal state." The normal state may 100% open, 0% open, 50% open, or any other desired predetermined position that is chosen as a "normal" in which a trip condition has been confirmed as no longer existing.

In some instances, placing the valve in a "normal state" includes allowing the logic solver 50 and/or safety system 14 to place the valve 411 in any desired state. This may involve removing or deactivating an interlock that precludes repositioning the valve 411. The interlock may be a "soft" interlock, such as a bit or flag that is set to "1" to indicate an activate interlock. In such an example, the SVP 60A may remove the interlock by changing the bit to "0." Sticking with this example, the SVP 60A may be configured such that as long as the interlock bit or flag is set to "1," the SVP 60A prevents manipulation of the valve position. Thus, by changing the bit to "0," the SVP 60A enables repositioning of the valve 411 (e.g., according to desires or commands of the safety system 14).

Figure 8:
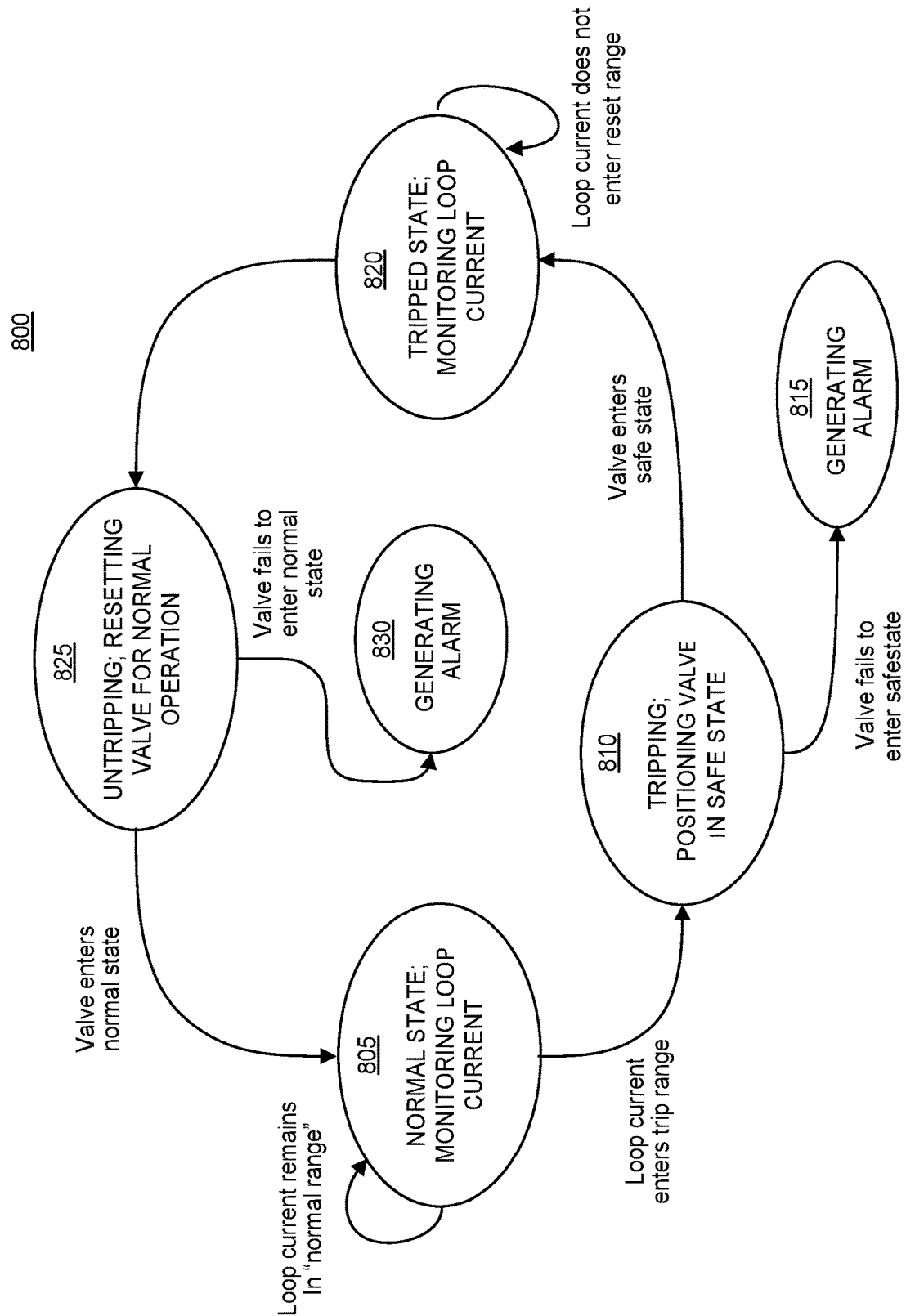
FIG. 8 is a state diagram for an example method for operating a positioner such that it initiates trips and resets in response to a loop current entering a trip range and a reset range, respectively.

FIG. 8 is a state diagram for an example method 800 for operating a positioner such that it initiates trips and resets in response to a loop current entering a trip range and a reset range, respectively. The method 800 may be implemented, in whole or in part, by the SVP 60A shown in FIGS. 1, and 4, and may be implemented via a set of circuits (e.g., of the SVP 60A) that are permanently or semi-permanently configured to perform the method 800. In an embodiment, the method 800 may be embodied by a set of instructions or routines that are stored to a memory (e.g., the memory 421 of the SVP 60A shown in FIG. 4) and executable by a processor (e.g., the processor 423) to implement the functionality of the method 800. Note, while the discussion below describes the method 800 with reference to the structure shown in FIGS. 1-5 (e.g., the SVP 60A), it will be appreciated that the method 800 may be implemented with any suitable any suitable valve controller or positioner. Further, note that the FIG. 8 and FIG. 7 depict similar functionality, but FIG. 8 depicts the functionality of the method 800 in the form of a state diagram rather than a flow chart.

In a state 805, the SVP 60A is in a "normal state" during which it monitors the loop current of the safety loop 1. When the loop current remains within a "normal range," the SVP 60A may remain in the normal state 805.

When the loop current enters a "trip range," the SVP 60A may proceed to a state 810. In some embodiments, when the loop current enters "x command range," the SVP 60A proceeds to a state (not shown) in which it implements a function "x." The function "x" may be any suitable function. In an embodiment, the "function x" is a stroke test, for example.

In any event, in the state 810, the SVP 60A positions the valve 411 in a safe state. If the SVP 60A detects that the valve 411 has not been successfully positioned in the safe state, the SVP 60A may proceed to a state 815. Otherwise, the SVP 60A may proceed to a state 820.

In the state 815, the SVP 60A generates an alarm. Generating the alarm may including transmitting a message to notify the safety system 14 and/or a user that the valve 411 has not been successfully repositioned from the normal state to the safe state. Generating the alarm may include transmitting the message to the logic solver 50 regarding the failed repositioning of the valve 411, and the logic solver 50 may respond by transmitting the message to one or more other nodes of the safety system 14 so that the safety system 14 is aware of the failure. In some embodiments, generating the alarm may include transmitting a message to a user's workstation (e.g., via the safety controller 50 and/or one or more other nodes of the safety system 14) to cause a notification (e.g., a light, sound, or a display of some sort) to be provided such that it is visible or audible to a user. In some embodiments, a message may be transmitted to the LCP 99A to cause a notification to be provided at the LCP 99A for a user regarding the failed reposition.

Generating the alarm may including transmitting a message to the LCP 99A or to the logic solver 50 (which may then transmit a message to be ultimately received at a workstation) to cause a notification (e.g., a light, sound, or a display of some sort) to be provided such that it is visible or audible to a user.

In the state 820, the SVP 60A is in a tripped state in which it monitors the loop current. In the state 820, the SVP 60A may have an activate interlock that prevents manipulating of the valve 411. While in the state 820, when the loop current fails to enter a reset range, the SVP 60A may remain in the tripped state 820. However, when the loop current enters a reset range, the SVP 60A may transition to a state 825.

In the state 825, the SVP 60A is "untripped" or reset and may attempt to reposition the valve 411 to a predetermined position associated with a "normal state." Additionally or alternatively, in some instances, in the state 825 the SVP 60A removes an interlock to thereby allow manipulation of the valve 411. When the SVP 60A detects that the valve 411 is not successfully repositioned from the safe state to the normal state (e.g., an interlock was not successfully removed or the valve 411 was not successfully repositioned to a "normal" position), the SVP 60A may proceed to a state 830. In the state 830, the SVP 60A generates an alarm to notify the safety system 14 and/or a user that the valve 411 has not successfully transitioned from the safe state to the normal state. Generating the alarm may include the same or similar steps as those mentioned regarding the state 815.

Staying with the state 825, when the valve 411 successfully transitions to a normal state (e.g., in which an interlock is removed and/or the valve 411 is positioned in a predetermined "normal" position), the SVP 60A transitions back to the normal state 805 in which it monitors the loop current of the safety loop 1.

V. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 600-800, specifically, the described functions may be implemented, in whole or in part, by the devices, circuits, or routines of the SVP 60A and LCP 99A shown in FIGS. 1-5. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

Further, generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Moreover, when used in the context of communication networks, the term "message" refers to a unit of communication, represented by a set of data, transmitted or received by a node (e.g., via a link). The set of data representing the message may include a payload (i.e., the content intended to be delivered) and protocol overhead. The overhead may include routing information and metadata pertaining to the protocol or payload (e.g., identifying the protocol for the message, the intended recipient node, the originating node, the size of the message or payload, data integrity information for checking the integrity of the message, etc.). In some instances, a packet or sequence of packets may be thought of as a message.

Additionally, as used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

Depending on the embodiment (and unless otherwise stated), one or more of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

Regarding the term "processor," the various operations of example methods described herein may be performed, at least partially, by one or more described or implicitly disclosed controllers or processors. Generally speaking, the terms "processor" and "microprocessor" are used interchangeably, each referring to a computer processor configured to fetch and execute instructions stored to memory.

By executing these instructions, the disclosed processor(s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. For example, when a single processor is described as performing a set of operations, it is understood that multiple processors may perform the set of operations in some embodiments according to any desired distribution across the multiple processors. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

What is claimed is:

1. A method for controlling safety valves comprising:
   electrically coupling a control panel to a safety loop that communicatively couples a logic solver to a valve positioner for a safety valve, wherein the logic solver is configured to control the safety valve by varying a loop current on the safety loop to cause the valve positioner to adjust the safety valve to a desired position;
   detecting, at the control panel, an actuation of a user interface element of the control panel that represents a trip command;
   responding to the actuation by causing the control panel to manipulate the loop current on the safety loop such that the loop current enters a range;
   detecting, at the valve positioner, the loop current entering the range;
   responding, at the valve positioner, to detecting the loop current entering the range by initiating a trip function configured to drive the safety valve to a safe state; and
   drawing, by the control panel, a level of current from the safety loop sufficient to power the control panel.

2. The method of claim 1, further comprising:
   detecting, at the control panel, an actuation of a second user interface element of the control panel that represents a second command;
   responding to the actuation by causing the control panel to manipulate the loop current on the safety loop such that the loop current enters a second range;
   detecting, at the valve positioner, the loop current entering the second range; and
   responding, at the valve positioner, to detecting the loop current entering the second range by initiating a second function.

3. The method of claim 2, wherein the second command is a stroke test function.

4. The method of claim 1, further comprising displaying, at the control panel, an indicator that indicates a state of the valve positioner or of the safety valve.

5. The method of claim 1, further comprising activating, at the valve positioner, an interlock to prevent an adjustment of the safety valve that would take the safety valve out of the safe state.

6. The method of claim 1, wherein the valve positioner is configured in a de-energize to trip (DETT) configuration, and wherein the control panel is configured to manipulate the loop current by activating a current sink to draw current from the safety loop and thereby drop the loop current.

7. The method of claim 6, wherein the range is 0-11 mA.

8. The method of claim 1, wherein the valve positioner is configured according to an energize to trip (ETT) configuration, and wherein the control panel is configured to manipulate the loop current by activating a current supply to supply current to the safety loop and thereby increase the loop current.

9. The method of claim 8, wherein the range is 13-20 mA.

10. A system comprising:
    a valve positioner including:
    (i) an output component configured to transmit an output signal from the valve positioner to a safety valve to drive a position of the safety valve;
    (ii) an input component configured to couple to a safety loop to thereby detect a loop current for a current signal on the safety loop; and
    (iii) a circuit configured to implement a control routine to control the output signal based on the loop current, wherein the circuit is configured to drive the output signal to a value selected to drive the position of the safety valve to a safe state in response to the loop current entering a preconfigured trip range; and a control panel communicatively coupled to the valve positioner, wherein the control panel includes:
(i) a communication interface configured to electrically couple to the safety loop;
(ii) a user interface element representing a trip command; and
(iii) a current control circuit electrically coupled to both the electrical output and the user interface element, wherein the current control circuit is configured to respond to an activation of the user interface element by drawing current from, or supplying current to, the safety loop sufficient to drive the loop current into the preconfigured trip range.

11. The system of claim 10, wherein the control panel further includes a power supply configured to power components of the control panel, and wherein the power supply sources power by drawing a level of current from the safety loop sufficient to power the components of the control panel.

12. The system of claim 10, wherein the control panel further includes a second user interface element representing a second command;
wherein the current control circuit is further configured to respond to an activation of the second user interface element by drawing current from, or supplying current to, the safety loop sufficient to drive the loop current into the preconfigured range linked to the second command; and
wherein the processor of the valve positioner is further configured to detect the loop current entering the second range and respond by initiating the second function.

13. The system of claim 12, wherein the second command is a reset function.

14. The system of claim 10, wherein the control panel further includes an indicator that indicates a state of the valve positioner or of the safety valve.

15. The system of claim 10, wherein the processor of the valve positioner is further configured to activate an interlock to prevent an adjustment of the safety valve that would take the safety valve out of the safe state.

16. The system of claim 10, wherein the processor of the valve positioner is configured according to a de-energize to trip (DETT) configuration, and wherein the control panel is configured to manipulate the loop current by activating a current sink to draw current from the safety loop and thereby drop the loop current.

17. The system of claim 16, wherein the range is 0-11 mA.

18. The system of claim 10, wherein the valve positioner is configured according to an energize to trip (ETT) configuration, and wherein the control panel is configured to manipulate the loop current by activating a current supply to supply current to the safety loop and thereby increase the loop current.

19. The system of claim 18, wherein the range is 13-20 mA.

20. The system of claim 10, wherein the valve positioner is a smart valve positioner including a processor, and wherein the valve positioner is configured to transmit or receive digital messages.

21. The system of claim 20, wherein the communication interface of the control panel is further configured to communicatively couple to the valve positioner via a digital link distinct from the current signal of the safety loop.

22. The system of claim 21, wherein the control panel is further configured to respond to the activation of the user interface element by transmitting, via the digital link, a digital message including a trip command, such that the valve positioner receives the trip command in addition to detecting the loop current being driven into the preconfigured trip range.

* * * * *

UNITED STATES PATENT AND TRADEMARK OFFICE
CERTIFICATE OF CORRECTION

PATENT NO. : 11,732,820 B2  
APPLICATION NO. : 17/078935  
DATED : August 22, 2023  
INVENTOR(S) : Marwan Brama Page 1 of 2

It is certified that error appears in the above-identified patent and that said Letters Patent is hereby corrected as shown below:

On the Title Page

At page 2, in Column 2, item (56), under "OTHER PUBLICATIONS", Line 6, "Fieldvue" should be -- FIELDVUE™ --.

At page 2, in Column 2, item (56), under "OTHER PUBLICATIONS", Line 16, "Fieldvue" should be -- FIELDVUE™ --.

At page 2, in Column 2, item (56), under "OTHER PUBLICATIONS", Line 20, "pdf?" should be -- pdf> --.

In the Drawings

At Fig. 1, Sheet 1 of 8, Tag "82", Line 1, "VIEWING." should be -- VIEWING --.

At Fig. 1, Sheet 1 of 8, Tag "80", Line 1, "CINFIG." should be -- CONFIG. --.

At Fig. 8, Sheet 8 of 8, "safestate" should be -- safe state --.

In the Specification

At Column 1, Line 47, "studies (HAZOP)," should be -- (HAZOP) studies, --.

At Column 11, Line 13, "to the by" should be -- to by the --.

At Column 14, Line 17, "determines the" should be -- determines that the --.

At Column 22, Line 35, "a 100%" should be -- 100% --.

At Column 22, Line 57, "activate)." should be -- activated). --.

Signed and Sealed this  
Twenty-second Day of October, 2024

Katherine Kelly Vidal  
*Director of the United States Patent and Trademark Office*

At Column 23, Line 19, "activate" should be -- activated --.

At Column 23, Line 65, "including" should be -- include --.

At Column 24, Line 15, "including" should be -- include --.

At Column 24, Line 23, "activate" should be -- activated --.